Oct. 29, 1929.  L. KIRSCHBRAUN  1,733,497
AQUEOUS DISPERSION AND PROCESS OF MAKING SAME
Filed Aug. 8, 1927
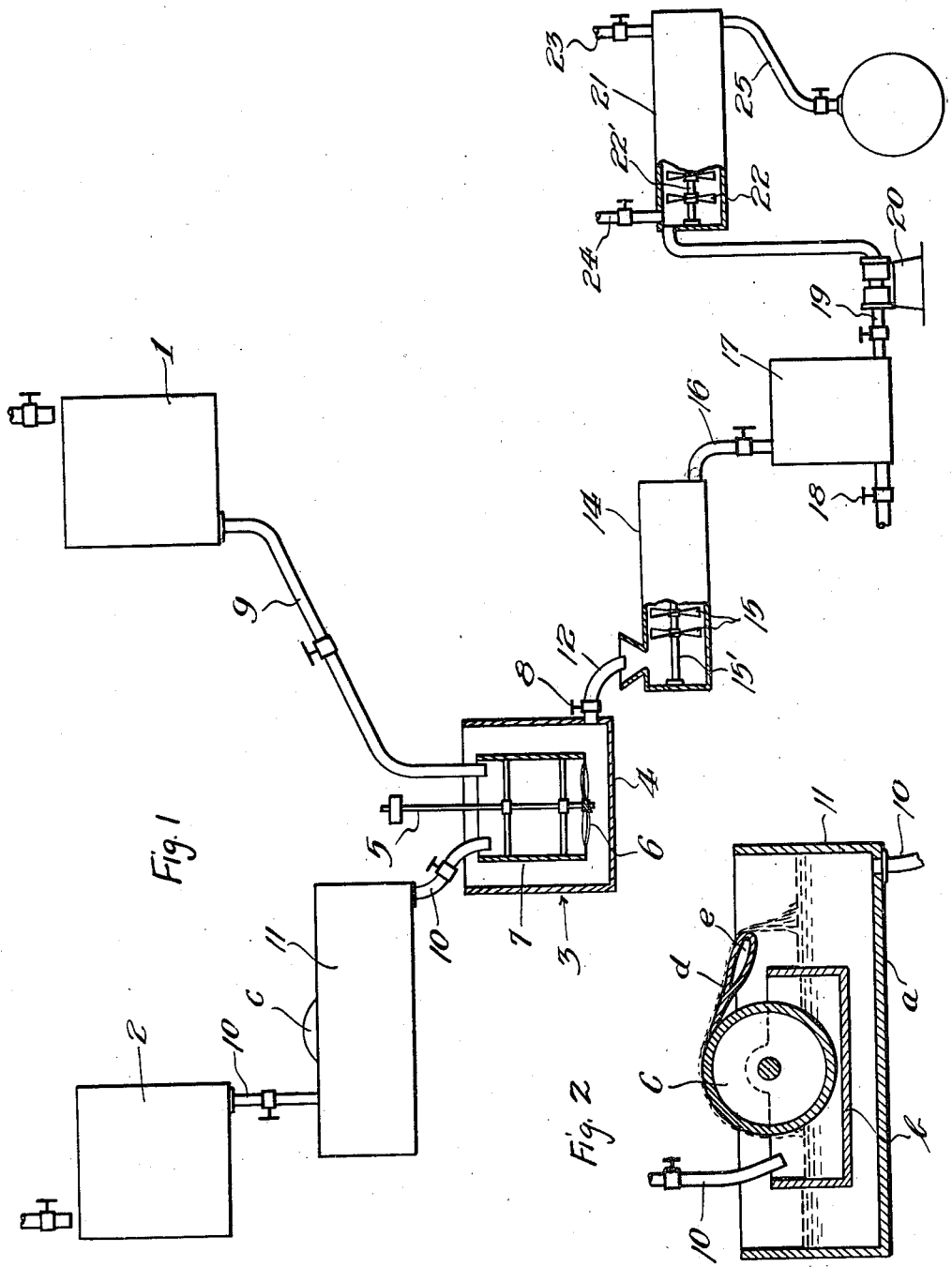

Patented Oct. 29, 1929

1,733,497

UNITED STATES PATENT OFFICE

LESTER KIRSCHBRAUN, OF LEONIA, NEW JERSEY

AQUEOUS DISPERSION AND PROCESS OF MAKING SAME

Application filed August 8, 1927. Serial No. 211,306.

This invention relates to dispersions and refers more particularly to aqueous dispersions of the type in which bituminous, pitchy or similar substances comprise the internal phase, while the water is in the external or continuous phase.

One of the essential properties of aqueous dispersions is that they are able to remain in suspension over long periods of time, and in my co-pending application Serial No. 207,822, filed July 22, 1927, I have set forth a process which, by the selection of the proper type of dispersive media and the maintenance of controlled temperature and other conditions during the dispersing action, results in the production of dispersions capable of remaining indefinitely in suspension, provided no substantial quantities of electrolytes are incorporated therein. When electrolytes are incorporated, it is generally found that the suspendability of the dispersions has been affected, although the dispersion, by virtue of the chemically inert nature of the dispersing media toward said electrolytes, is what may be termed stable toward electrolytes, that is, it remains unbroken in the presence of large quantities thereof.

For some uses to which these products may be put, however, it is desirable and frequently essential, to incorporate therein various electrolytes such as acids, acid salts, or other substances functioning as do electrolytes to cause flocculation, accompanied by thickening and settling out in the dispersed mass. While these thickening effects may be overcome by the addition of water, such procedure is generally objectionable, especially where substantial quantities of the electrolytes are introduced, for the reason that the increase thus occasioned in the water content of the product materially shortens the "body" of the dispersion and impairs its ability to remain in suspension over long periods of time.

The object of the present invention is to provide a process by which electrolytes in substantial quantities may be successfully incorporated with dispersions of the type indicated, without appreciably affecting the suspendability thereof, which object is preferably accomplished by adding the electrolytes to the dispersion while the latter is being subjected to a rapid beating or whipping action, as will be more fully hereinafter described.

In the drawings:

Fig. 1 illustrates diagrammatically an arrangement of apparatus which may be utilized in carrying out the process of the present invention.

Fig. 2 is a fragmentary enlarged view of a cooling device for the base to be dispersed.

Referring to the drawings, the numeral 1 represents conventionally an apparatus provided with suitable mixing or stirring mechanism for making an aqueous suspension of the material selected as the dispersive media. This media may be any one or a mixture of well known paste-forming colloids, such as clay, bentonite, colloidal metallic oxides, silicates, or the like. Where the dispersive media is composed of a mixture of clay and bentonite, the proportions of these constituents may vary from 50 parts clay and 50 parts bentonite, to 70 parts clay and 30 parts bentonite, more or less. The dispersive media may be worked up in the blunger to a thin aqueous suspension containing say 7 to 10 parts by weight of water to one part by weight of the dispersing media, more or less. At 2 is indicated a supply of the base to be dispersed. This base may be any heat-liquefiable material normally immiscible with water, and may comprise for example, bituminous material either of a solid or semi-solid consistency such as asphalt, animal or vegetable pitches, resins, and the like. If desired, the selected base may be softened with a suitable fluxing oil.

By way of example, I may disperse steam refined asphalt having a melting point of say 100 to 200 degrees F. more or less, the asphalt being brought to a molten condition by heating at temperatures depending upon the melting point thereof.

The dispersing operation may be carried out in an apparatus such as illustrated at 3. This apparatus may comprise a container 4, within which may be mounted a rapidly rotating shaft 5, having agitating propellers 6 fixed thereto. The container may be provided with a directional baffle 7, which may take the form of an open-ended conduit, arranged concentrically with, and spaced from the inner surface of the container. The propeller blades may be pitched in such fashion that the material undergoing agitation by the rapid rotation there, is forced downwardly internally of the conduit and then around and upwardly through the annular space between the conduit and the wall of the container. In order to regulate the temperature conditions within the container, the walls thereof may be jacketed in an obvious manner, or they may be lined with coils for conveying therethrough suitable temperature regulatory media. If desired, the conduit 7 may also be jacketed for the reception of temperature regulating means.

A bulk supply of the end product may be constantly maintained within the container 4, a valve being provided at 8 for the withdrawal of finished material.

In carrying on the dispersion in a continuous manner, the aqueous suspension from the blunger 1, and the molten asphalt or other base may be conducted in separate streams through the feed pipes 9 and 10 respectively, to the dispersing apparatus 3.

It is essential for successful dispersion, especially where low melting point asphalt is used, to operate under temperature conditions controlled so as to avoid partial or complete coalescence or the formation of particles of an undesirably large size.

Thus, if the temperature of the fluid asphalt entering the dispersing apparatus, or if the mass undergoing dispersion is permitted to rise too high, particles of large size may be formed and the material in the dispersing apparatus must be cooled or additional water must be added to avoid partial or complete coalescence of dispersed particles so that the body and viscosity of the product are impaired by virtue of the increased particle size as well as by the added amount of aqueous phase.

In order to regulate the temperature of the incoming asphalt, a cooling device 11 may be interposed, as shown in the feed line 10. The cooling device may take any desired form. As illustrated in Fig. 2, however, a preferred arrangement may comprise an enlarged supply tank "a" within which is mounted a smaller feed tank "b" spaced a considerable distance from the bottom of tank "a" and above the liquid level maintained in "a". A hollow drum "c" may rotate within the tank "b", serving as a cooling surface for the hot asphalt. Cooling water may be supplied to the interior of the drum "c" and withdrawn therefrom through suitable pipes connecting therewith. A doctor blade or baffle "d" is arranged to contact at one of its edges with the outer surface of the drum "c", the opposite edge of the doctor projecting beyond the wall of tank "b". If desired, the outer portion of the doctor may be chambered as shown at "e" to receive steam or other heating means. The hot liquid asphalt is supplied through the pipe 10 to the inner tank "b", and as the drum "c" rotates therein, a film of the hot asphalt is picked up thereby and carried to the point where the edge of the doctor scrapes the same from the drum, the asphalt then flowing over the surface of the doctor blade and being directed thereby into the large tank "A". By thus providing a large surface contact between the continuously flowing cooling medium within the drum and the relatively thin film of hot asphalt on the surface thereof, it becomes possible to reduce the temperature of the asphalt to the point desired and to maintain such temperature within very narrow limits, so that the dispersing action may be successfully carried on without coalescence. Where the material being dispersed is an asphalt having a melting point of say 110 degrees, the temperature of the stream of asphalt entering the dispersing apparatus should be substantially 160 degrees F.

Likewise, the temperature within the dispersing apparatus should be controlled and maintained within reasonably narrow limits.

As stated before, the dispersed material may be withdrawn continuously from the dispersing apparatus, an ordinary valved discharge pipe 12, being provided for this purpose adjacent the lower end of the container 4. The material thus withdrawn, is generally in the form of a thick pasty mass, the viscosity of which may be reduced by a rapid beating treatment as set forth in my issued Patent No. 1,616,904 dated February 8th, 1927. For this purpose, I may direct the thick pasty end-product from the dispersing apparatus to a beating apparatus indicated diagrammatically at 14. This vessel may be provided with suitable impacting blades 15 mounted on rotary shaft 15' adapted to rapidly beat or whip the dispersion and thereby reduce the viscosity thereof, while imparting thereto a heavily-bodied, molasses-like consistency.

After the material has been considerably beaten out, and its paste-like character changed and thinned to a more fluid consistency, it may overflow through the pipe 16 to a storage tank or reservoir 17 in which a bulk supply of the end product may be maintained.

I have found in accordance with the present invention that substantial quantities of electrolytes may be incorporated in the dispersion without the necessity for the addition of such further quantities of water for overcoming the flocculation and thickening caused by the electrolytes as will impair the suspendability of the dispersion by introducing the electrolytes while subjecting the dispersion to beating or whipping treatment. In this manner, I am able to produce a dispersion which is not only stable but one which is highly suspendable in the presence of such electrolytes.

Accordingly, I may transfer a supply of the material from the reservoir 17 through the pipe 19, to a second beating apparatus 21, suitable pumping mechanism being indicated at 20. The beating apparatus 21 may be a double pug mill mixer, or it may be substantially identical with the apparatus shown at 14, provided with revolving impacting blades 22 on shaft 22' for rapidly agitating and beating the material within the tank. Concurrently with the beating of the material within this secondary beater stage, I may introduce the selected electrolyte through the feed line 23, in quantities as desired. Apparently the beating treatment functions to dissipate the thickening effect set up by the electrolyte and hence the incorporation of the electrolyte is best accomplished by adding the same in small increments during the beating or whipping action, at such rate that the thickening effect due to each added increment is dissipated before succeeding increments are added. If added too rapidly, the mass may thicken faster than its viscosity is reduced by the beating action, in which case the dispersion may be broken or its particle size increased by the extremely high internal friction set up by the action of the impacting blades. Any such action which may result in the breaking of the dispersion is of course, to be avoided.

As one specific example of electrolytes, I may introduce potassium dichromate into a dispersion in the beater 21, while the dispersion is being subjected to beating treatment. This salt is preferably added in quantities ranging from 0.1% to 1.0% more or less, by weight on the basis of the dispersion.

When a salt of this type is added to the dispersion, the product is rendered highly suitable for rust inhibitive work. A coating of the dispersion so treated, when applied to a metallic surface functions to bathe the latter in the aqueous phase containing the rust inhibitive salt so as to initially render the surface passive, the salt upon drying of the film becoming concentrated as does the dispersing agent, in segregated film areas in interfacial contact throughout the mass, so that any moisture penetrating the film and reaching the metallic surface carries with it ions of the rust inhibitive salt.

The salt may be introduced either in the form of a dry powder or while dissolved in a minimum amount of water. The addition of the salt is preferably made slowly and in small increments, the successive increments being added only as fast as the beating action dissipates the thickening or flocculation induced by the previously added portions.

Again, highly water-resistant films may be produced by treatment with acids, and these may be similarly incorporated by a slow gradual addition during the subjection of the dispersion to the beating action. The acid employed for this purpose may comprise, for example, hydrochloric, nitric, phosphoric, or chromic, and the total quantity added should be sufficient to bring the pH of the system to about 3.0 more or less, at which point the water-free film is highly impermeable and water-resistant for a short period of drying. In certain instances, it may be desirable to add first a salt such as potassium dichromate and then an acid such as hydrochloric. In such case, each of these electrolytes may be gradually incorporated during the beating action as already described.

Where the product is intended to be used as a protective coating for steel, phosphoric acid or its acid salts can be employed so as to realize the advantage of the rust inhibitive properties of the protective coating which results from the reaction of this acid with the metal. A dispersion carrying these rust inhibitive compounds and possessing acid properties to produce a highly resistant film, may comprise say 0.1% or more of potassium dichromate and zinc chromate each, plus about 0.3% of phosphoric acid.

It is noted that while the operation of the process involves the treatment of a batch supply in the apparatus 21, the dispersing operation carried on in the apparatus shown at 3, is nevertheless continuous, and is not interrupted by the batch operation carried on at 21, inasmuch as the asphalt and aqueous suspension are supplied to the dispersing apparatus in continuous streams, the end-product being continuously withdrawn at 12, beaten out in 14, and stored temporarily as a large bulk supply, in the reservoir 17, as already described.

The finished dispersion treated with the desired quantities of electrolyte and reduced to a freely-flowing viscosity by the beating action, as described, may be withdrawn from the beater tank 21 through the pipe 25 and led to suitable storage tanks.

When it is desired to utilize some of the end-product which has been reduced in viscosity at 14, without the secondary treatment for the incorporation of electrolytes, the same may be withdrawn from the tank 17 through the discharge outlet 18.

In certain instances I may provide for a reduction in the amount of beating required to dissipate the thickening effect of the added electrolytes by incorporating into the dispersion a protective colloid such as tannic acid in amounts ranging from about $\frac{1}{10}$% to 1% of the dispersion, this reagent being incorporated prior to the addition of the selected electrolyte. The protective colloid serves not only to enhance the suspendability of the product but also protects it to a considerable extent against the flocculating effect of the electrolyte. Gelatine may be substituted for tannic acid.

I claim as my invention:

1. In a process of incorporating with an aqueous dispersion of a bitumen-pitch-type base, electrolytes of such character and in such amount as would normally produce flocculation, the improvement which comprises subjecting the treated dispersion to beating action to substantially dissipate the flocculating effect caused by the introduction of said electrolytes and render the dispersion suspendible.

2. In a process of incorporating with an aqueous dispersion of a bitumen-pitch-type base, electrolytes of such character and in such amount as would normally produce flocculation, the improvement which comprises subjecting the dispersion to beating action during the incorporation of said electrolytes to substantially dissipate the thickening caused by such flocculation and render the dispersion suspendible.

3. In a process of incorporating with an aqueous dispersion of a bitumen-pitch-type base, electrolytes of such character and in such amount as would normally produce flocculation, the improvement which comprises subjecting the dispersion to beating action while gradually adding said electrolytes thereto to substantially dissipate thickening caused by flocculation and render the dispersion suspendible.

4. In a process of incorporating with an aqueous dispersion of a bitumen-pitch-type base electrolytes of such character and in such amounts as would normally produce flocculation, the improvement which comprises subjecting said dispersion to beating action while incorporating therewith said electrolytes in successive increments to substantially dissipate thickening caused by said flocculation and render the dispersion suspendible.

5. The process which comprises subjecting an aqueous dispersion of a bitumen-pitch-type base to beating sufficient to reduce the viscosity thereof, and thereafter incorporating an electrolyte in the mass of reduced viscosity while subjecting same to continued beating action to render the dispersion suspendible.

6. A process which comprises incorporating in an aqueous dispersion of a bitumen-pitch-type base an electrolyte of such a character and in sufficient quantity to cause thickening of the dispersion, dissipating said thickening effect by beating the dispersion containing said electrolyte, and adding further quantities of electrolyte while continuing said beating action substantially at the rate at which said thickening effect is dissipated by the beating action.

7. In a process of incorporating with an aqueous dispersion of a bitumen-pitch-type base containing an inert dispersing agent, electrolytes of such character and in such amount as would normally produce flocculation, the improvement which comprises subjecting the treated dispersion to beating action to substantially dissipate thickening caused by flocculation and render the dispersion suspendible.

8. An aqueous dispersion of a bitumen-pitch-type base containing electrolytes of such character and in such quantity as would normally flocculate the dispersion, and treated to render the dispersion relatively permanently suspendible.

9. An aqueous dispersion of a bitumen-pitch-type base containing an inert dispersing agent and containing electrolytes of such character and in such quantity as would normally flocculate the dispersion, and treated to render the dispersion relatively permanently suspendible.

10. An aqueous dispersion of a bitumen-pitch-type base containing less than 1% of flocculating electrolyte by weight relative to the dispersion but sufficient to normally induce flocculation, and treated to render the dispersion relatively permanently suspendible.

11. An aqueous dispersion of a bitumen-pitch-type base containing rust inhibiting electrolytes of such character and in such quantity as would normally flocculate the dispersion and treated to render the dispersion relatively permanently suspendible.

12. An aqueous dispersion of a bitumen-pitch-type base containing electrolytes comprising metallic chromates of such character and in such quantity as would normally flocculate the dispersion and treated to render the dispersion relatively permanently suspendible.

In testimony whereof I affix my signature.

LESTER KIRSCHBRAUN.